March 31, 1970   R. E. PHIPPS   3,503,182
LIQUID FILLING MACHINE

Filed Jan. 4, 1967   12 Sheets-Sheet 1

INVENTOR
ROBERT E. PHIPPS
BY Wolf, Greenfield & Sacks
ATTORNEYS

March 31, 1970 R. E. PHIPPS 3,503,182
LIQUID FILLING MACHINE
Filed Jan. 4, 1967 12 Sheets-Sheet 2
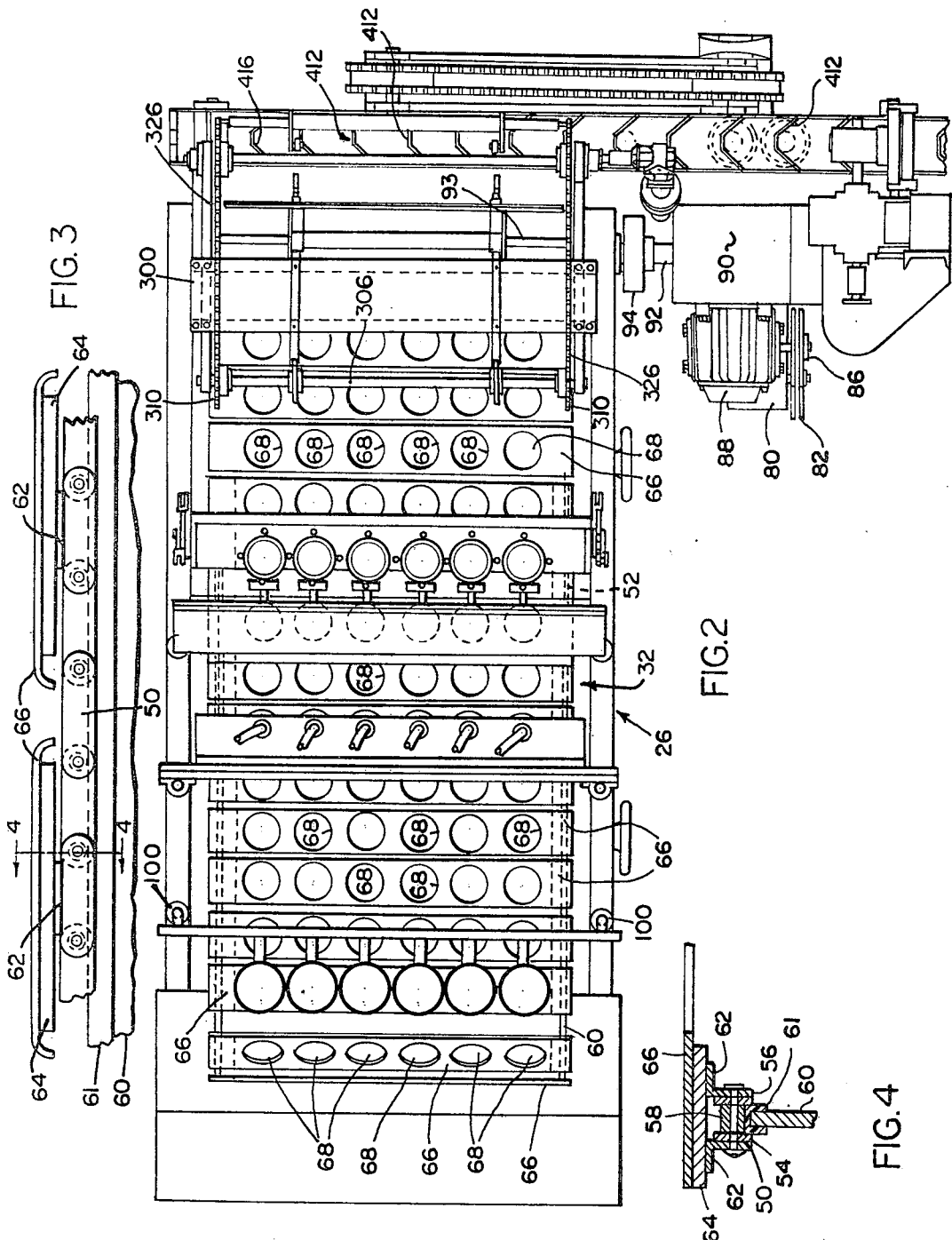
INVENTOR
ROBERT E. PHIPPS
BY *Wolf, Greenfield - Hicken*
ATTORNEYS March 31, 1970     R. E. PHIPPS     3,503,182
LIQUID FILLING MACHINE Filed Jan. 4, 1967     12 Sheets-Sheet 3

INVENTOR
ROBERT E. PHIPPS
BY,
ATTORNEYS

March 31, 1970  R. E. PHIPPS  3,503,182
LIQUID FILLING MACHINE
Filed Jan. 4, 1967  12 Sheets-Sheet 4
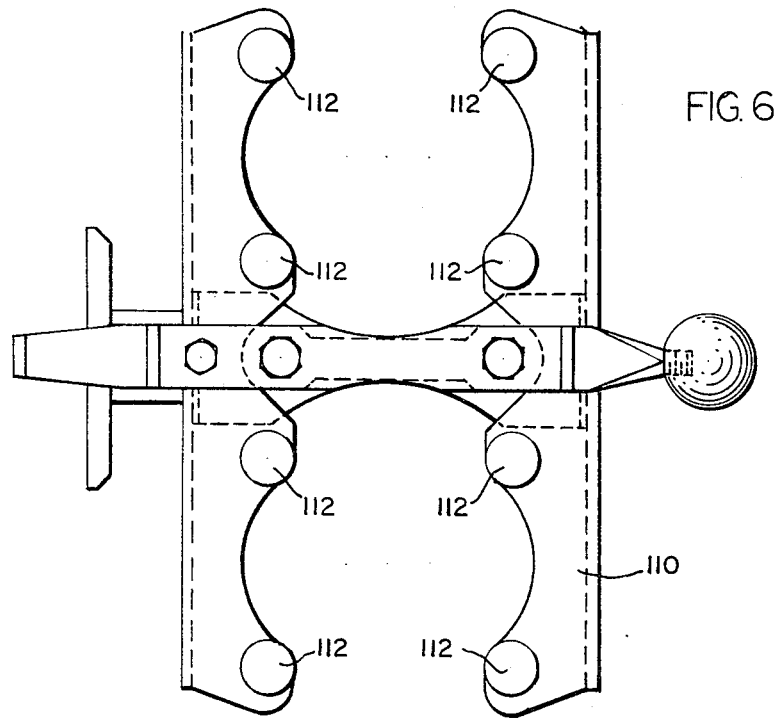
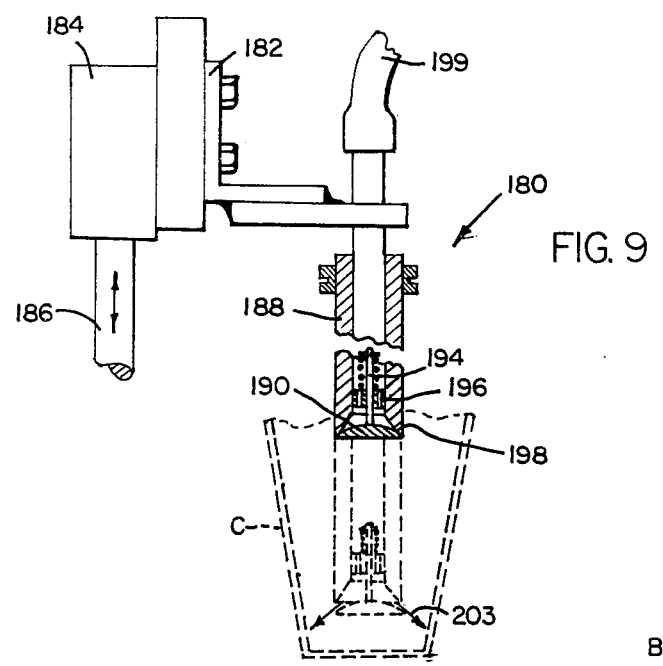
INVENTOR
ROBERT E. PHIPPS
BY,
ATTORNEYS March 31, 1970    R. E. PHIPPS    3,503,182
LIQUID FILLING MACHINE Filed Jan. 4, 1967    12 Sheets-Sheet 5

INVENTOR
ROBERT E. PHIPPS
BY,
ATTORNEYS

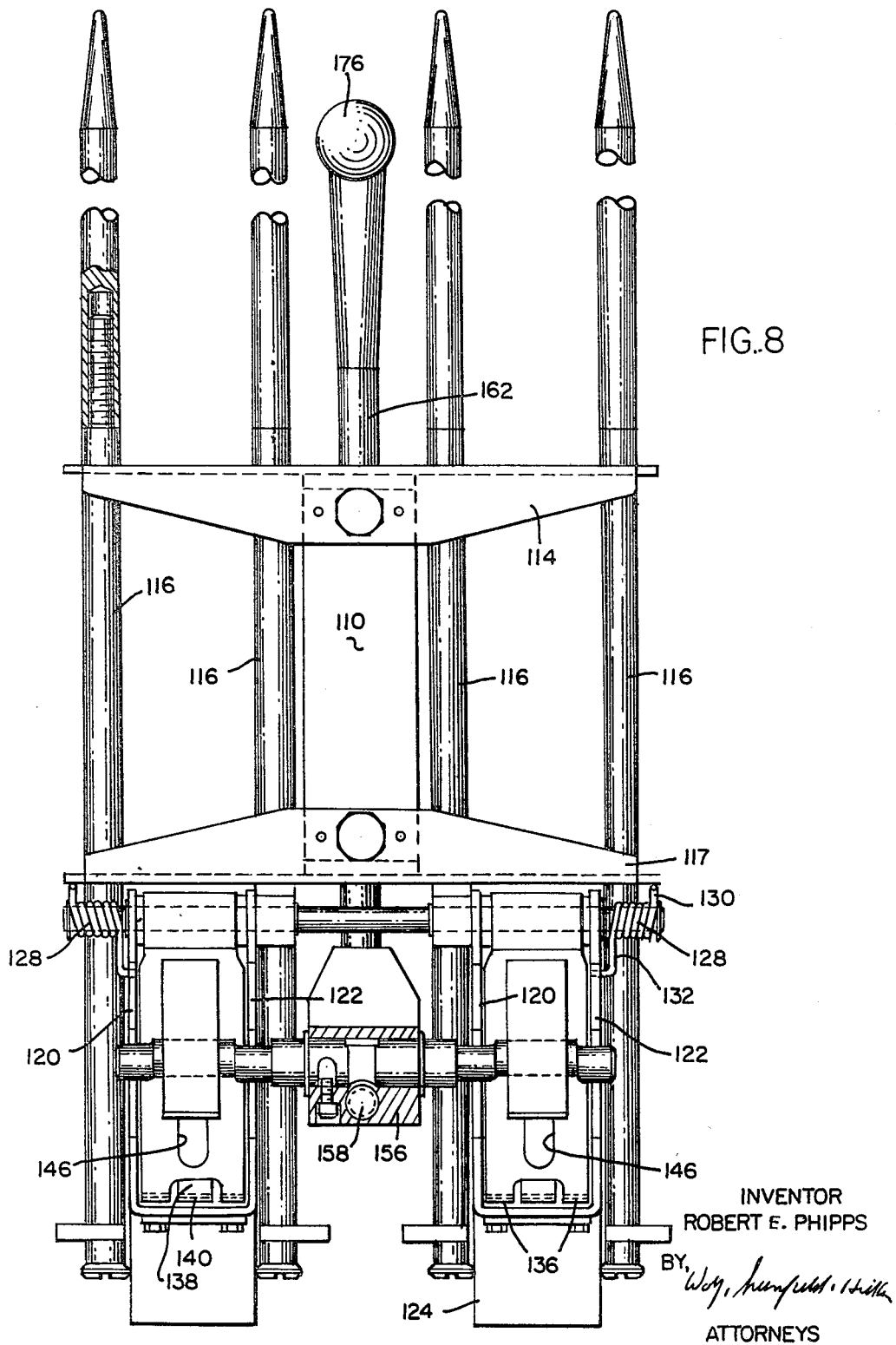

March 31, 1970     R. E. PHIPPS     3,503,182
LIQUID FILLING MACHINE
Filed Jan. 4, 1967     12 Sheets-Sheet 7

INVENTOR
ROBERT E. PHIPPS
ATTORNEYS

March 31, 1970     R. E. PHIPPS     3,503,182

LIQUID FILLING MACHINE

Filed Jan. 4, 1967     12 Sheets-Sheet 8

INVENTOR
ROBERT E. PHIPPS
BY,
ATTORNEYS

March 31, 1970   R. E. PHIPPS   3,503,182
LIQUID FILLING MACHINE

Filed Jan. 4, 1967   12 Sheets-Sheet 10

INVENTOR
ROBERT E. PHIPPS
BY Wolf, Greenfield + Sticker
ATTORNEYS

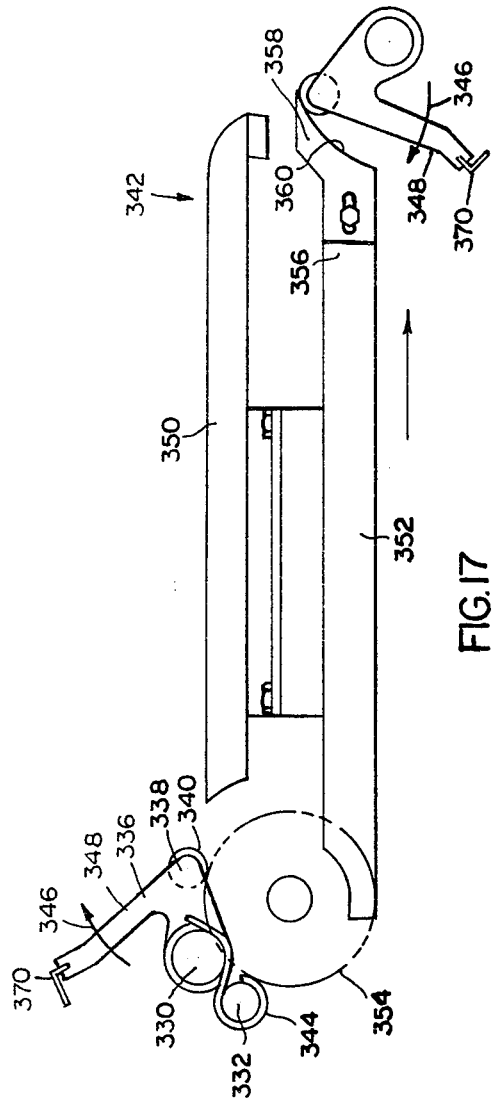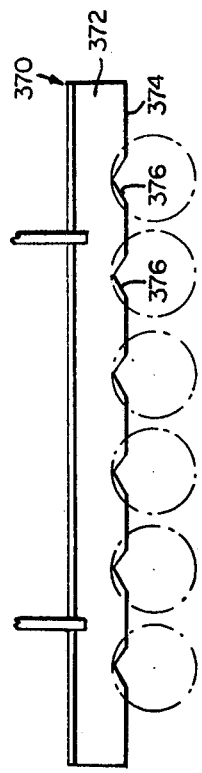

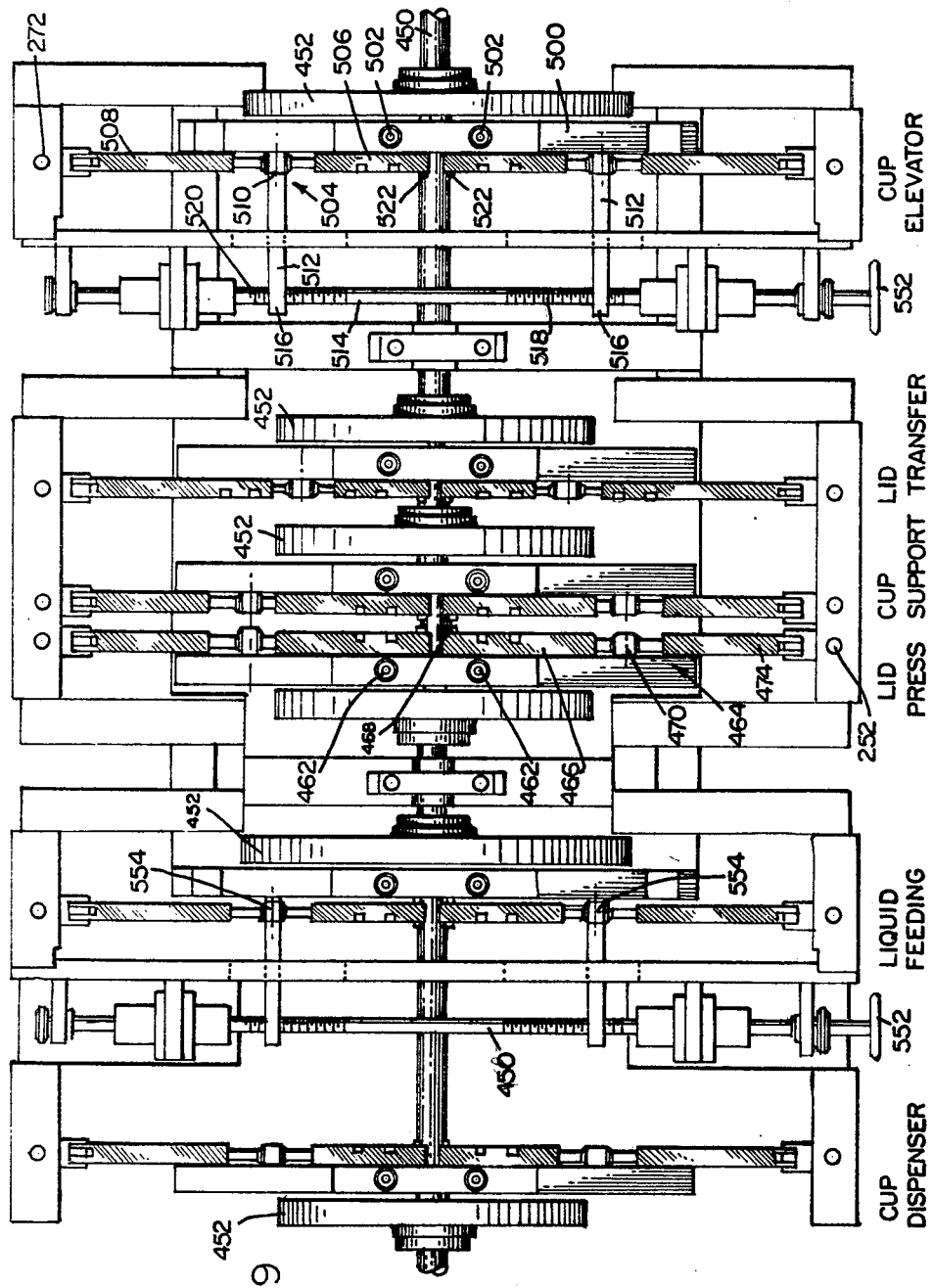

United States Patent Office 3,503,182
Patented Mar. 31, 1970

3,503,182
LIQUID FILLING MACHINE
Robert E. Phipps, Greenville, N.H., assignor to Sweetheart Plastics, Inc., Wilmington, Mass., a corporation of Massachusetts
Filed Jan. 4, 1967, Ser. No. 607,251
Int. Cl. B65b *3/00, 7/28*
U.S. Cl. 53—282       10 Claims

ABSTRACT OF THE DISCLOSURE

A liquid filling machine having a plurality of parallel lines defined by a flight conveyor 26 that moves step by step through a number of stations that contain container dispensers 34, liquid feeding subassemblies 36, lid dispensers and transfer mechanisms 40, lid capping mechanisms 38, cup elevator assemblies 42, a transfer conveyor 44, and means for timing the operation of the mechanisms in each station with the step movement of the flight conveyor.

BACKGROUND AND SUMMARY OF THE INVENTION

Figure 1:
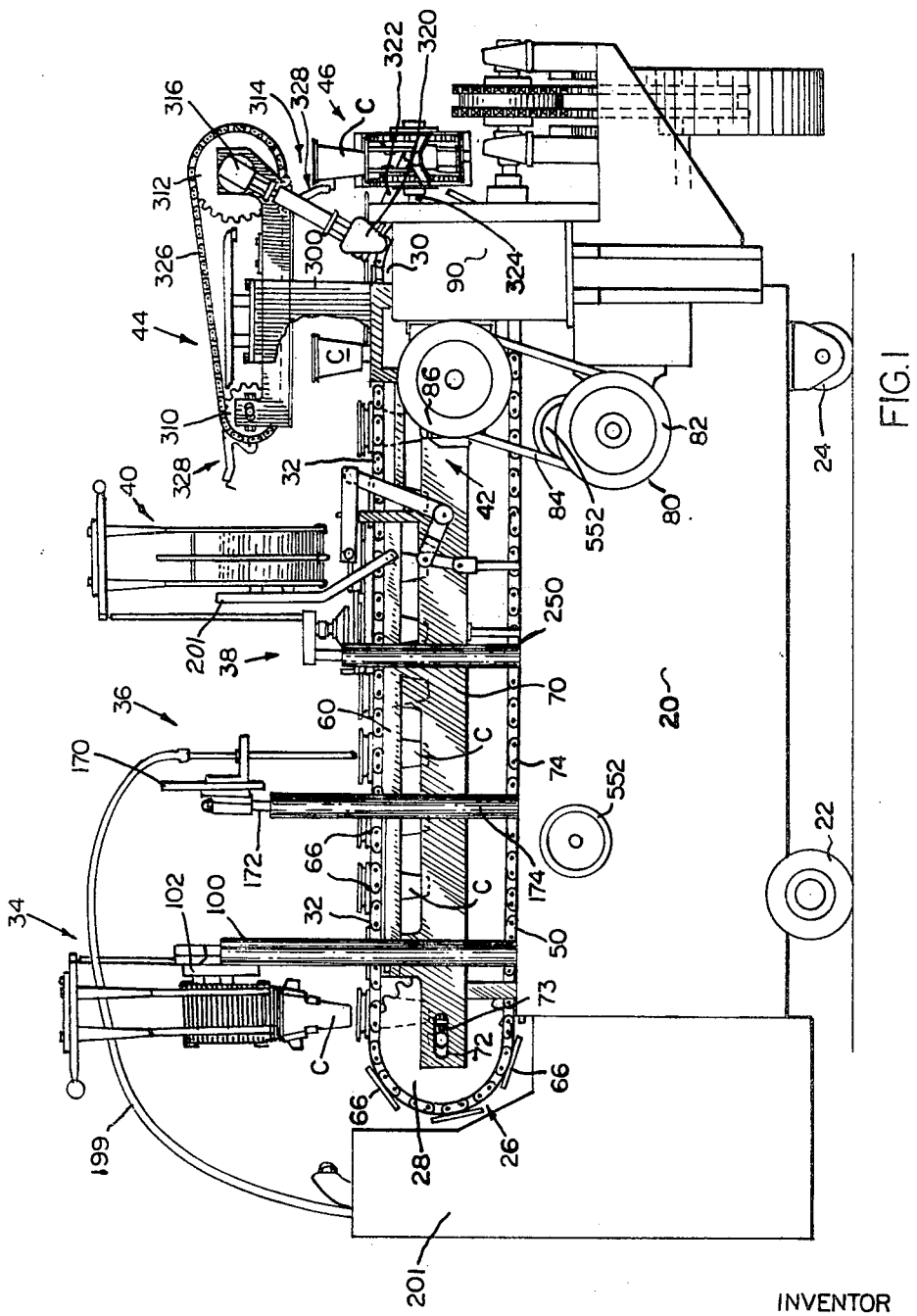

This invention relates to liquid filling machines and more particularly comprises a new and improving machine for simultaneously and continuously filling and capping a plurality of containers.

One important object of this invention is to provide a liquid filling machine of limited size which automatically receives, fills, caps and discharges a plurality of containers.

Another important object of this invention is to provide such a machine which may readily be adjusted to accommodate cups of different size and dispense variable quantities of liquid determined by the size of the containers.

Still another important object of this invention is to provide a liquid filling machine which on a single portable chassis can fully automatically fill and cap containers in large numbers.

Yet another important object of this invention is to provide a liquid filling machine capable of filling with liquid approximately 240 containers per minute.

Still another important object of this invention is to provide a liquid filling machine capable of accomplishing all of the foregoing objects and which may be manufactured at a cost which puts the machine within reach of even relatively small packagers.

Yet another important object of this invention is to provide a filling mechanism in a machine, which does not depend for operation upon the column strength of the container being filled.

The machine of this invention is particularly designed for use in the food industry for filling containers with foods that are in a liquid state at least during the filling operation. More particularly, the machine is designed to fill rapidly, disposable containers with such items as juice, milk, soft drinks, gelatin-type desserts which are liquid in form at ambient temperatures, and similar types of foods. Heretofore great difficulty had been encountered in filling open mouthed plastic containers with such materials because of problems of spillage, weak sidewalls, etc. It is evident that an uncapped cup cannot be filled with a liquid and thereafter be accelerated and decelerated rapidly on a conveyor without spilling a substantial quantity of the liquid. It is also evident that care must be taken in filling such containers to avoid splashing of the liquid from them. The present invention is capable of rapidly filling a very substantial number of containers and moving them from the filling station to a capping station without spillage.

To accomplish these and other objects, the liquid filling machine of this invention includes on a single chassis a flight conveyor along which are arranged in sequence cup disspensers, liquid filling machines, capping subassemblies, cup elevators, an exit conveyor and a transfer conveyor each defining an operating station. In its preferred form, the machine has a plurality of parallel runs defined by the flight conveyor so that a number of cups are simultaneously dispensed, filled, capped, and removed from the flight conveyor as the conveyor moves the cups step by step through the stations.

Figure 5:
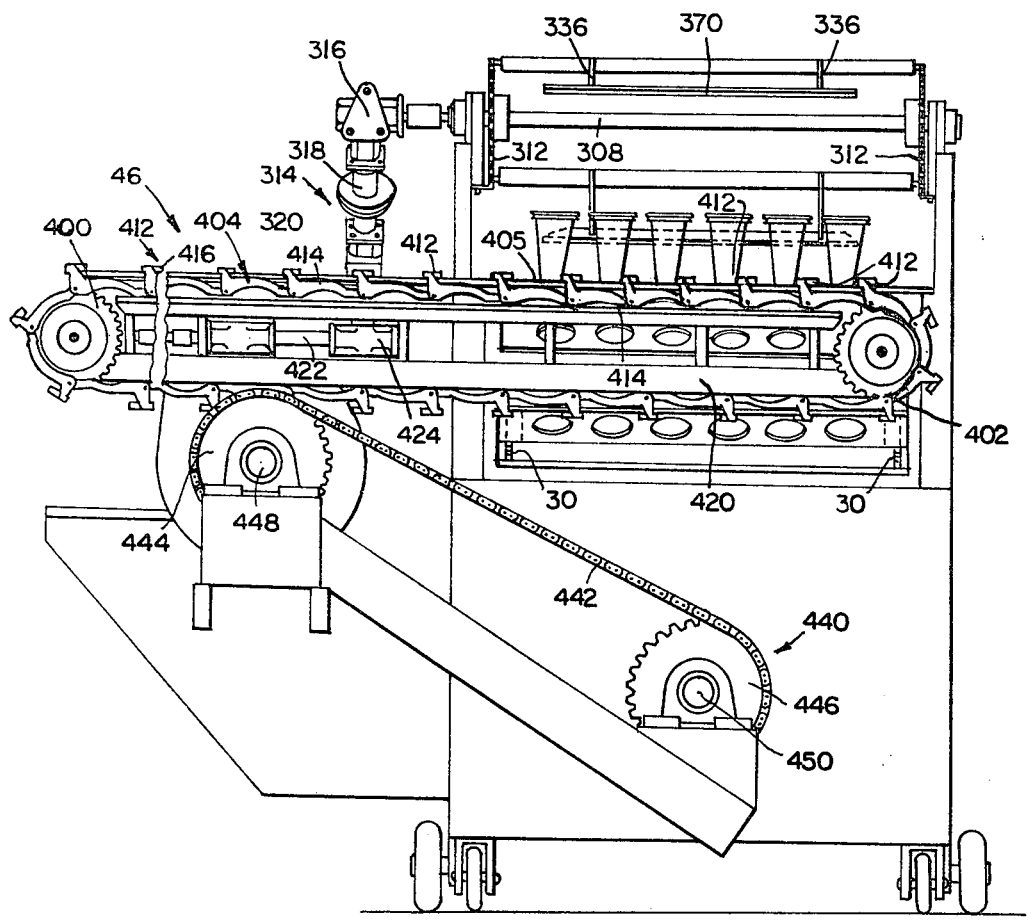
Figure 7:
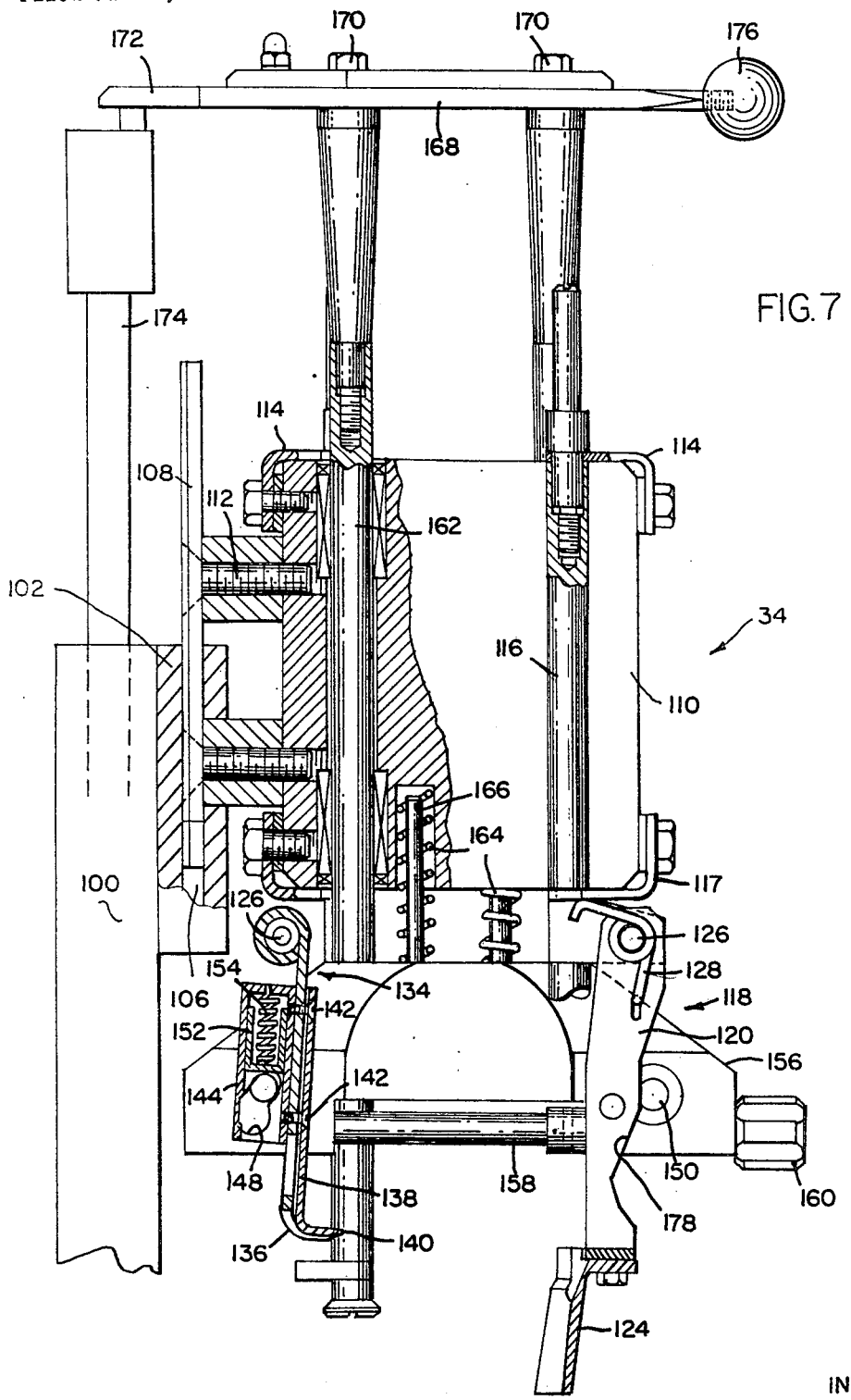
Figures 10, 13:
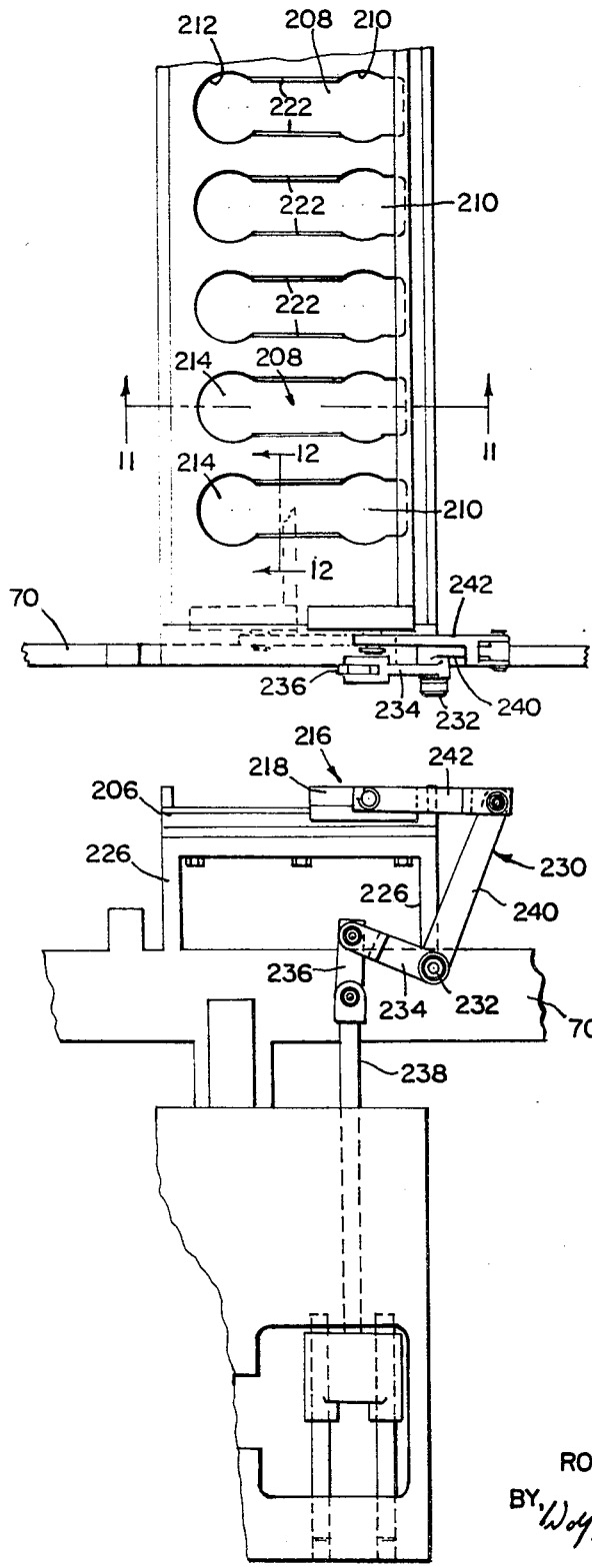
Figure 11:
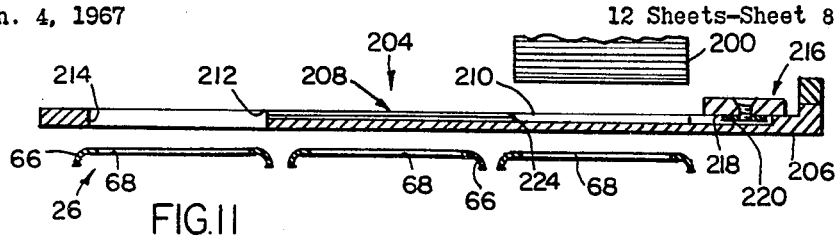
Figure 12:
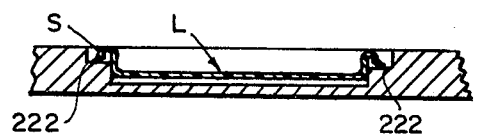
Figure 14:
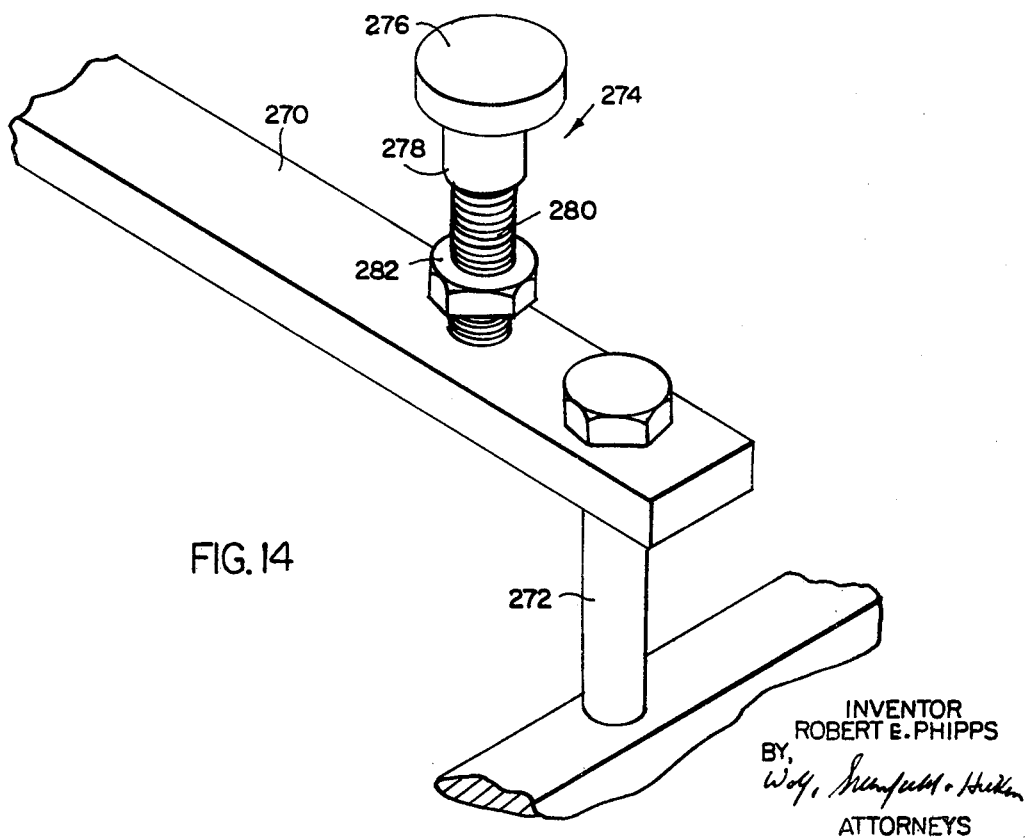
Figure 15:
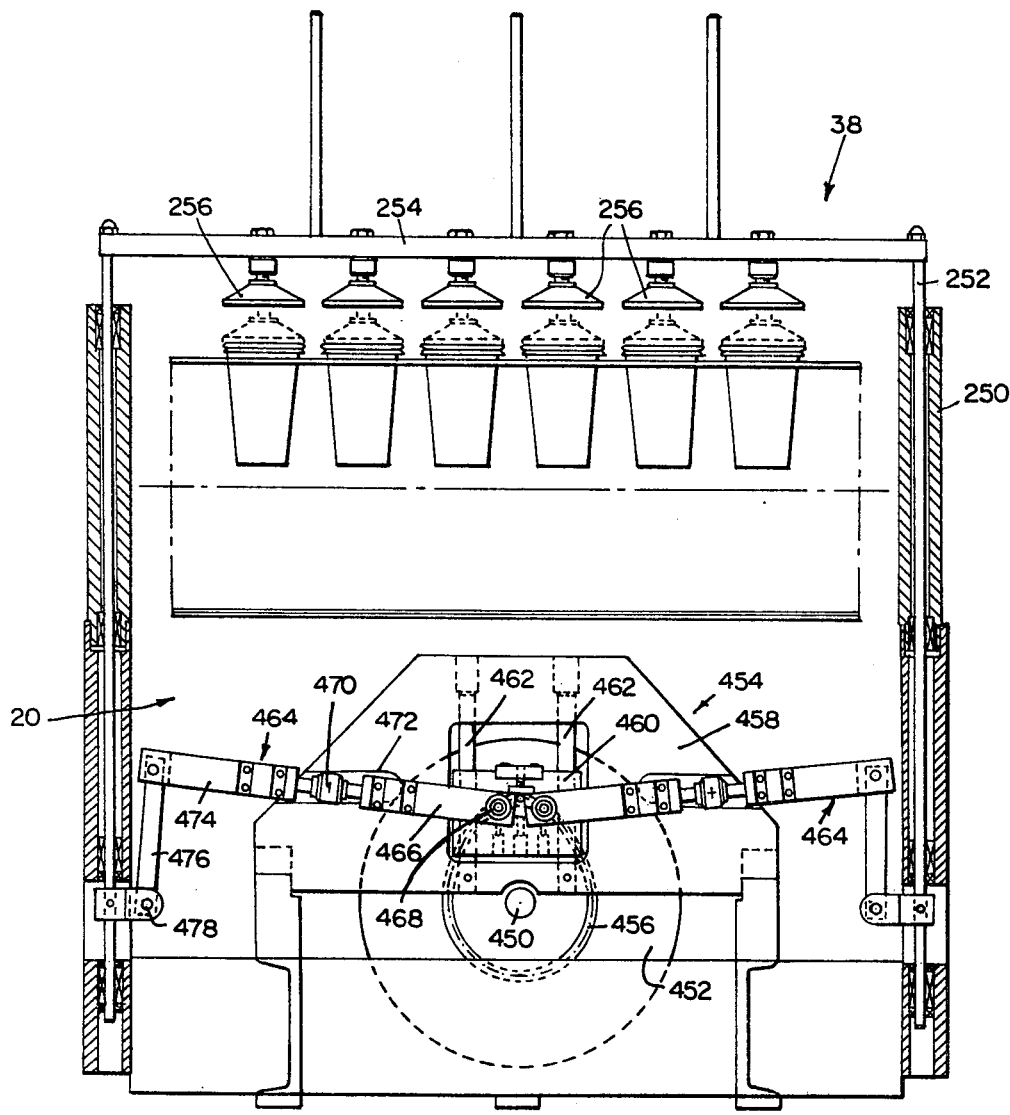
Figure 16:
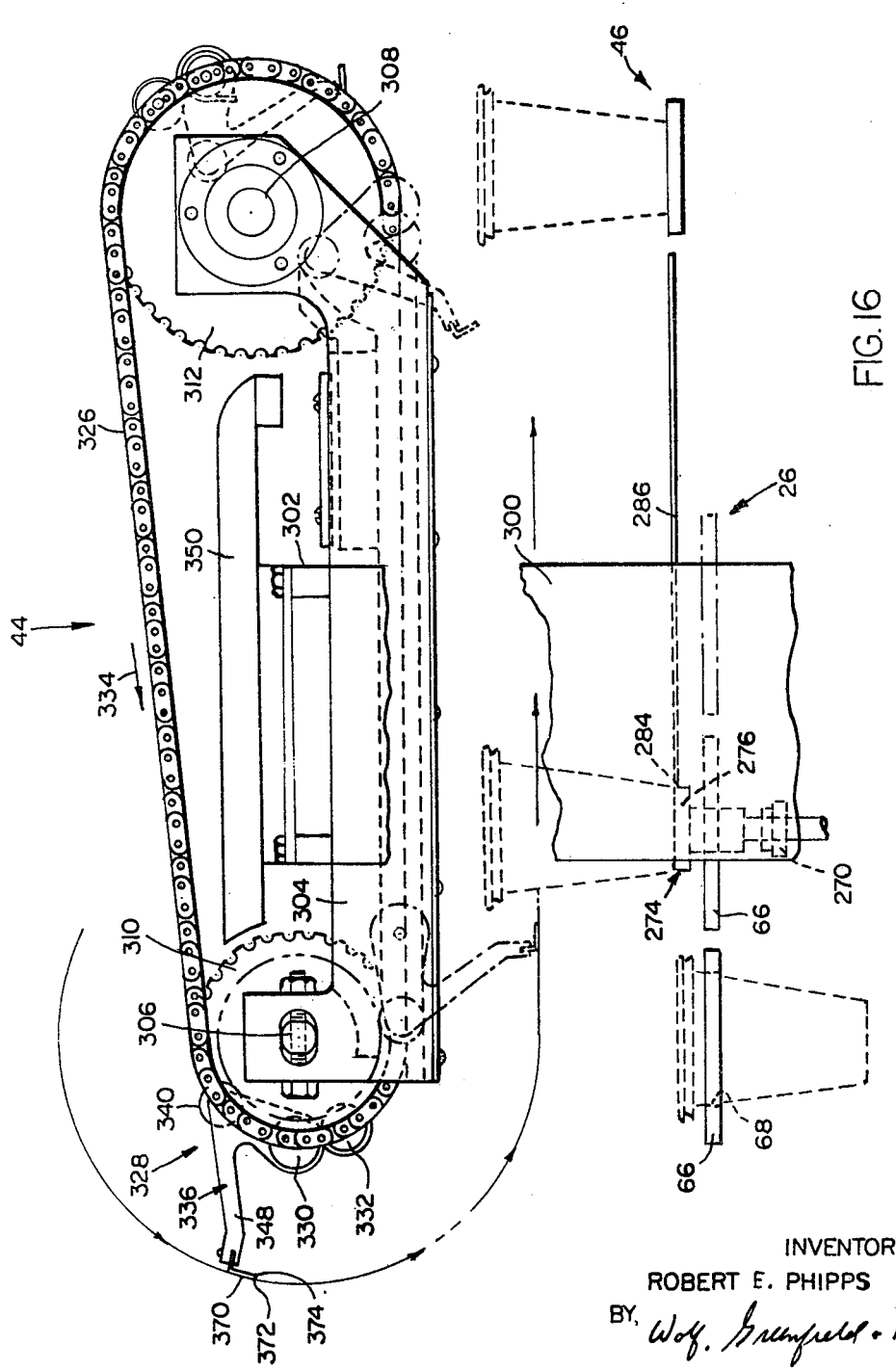

These and other objects and features of this invention, along with its incident advantages will be better understood and appreciated from the following detached description of one embodiment thereof, selected for purposes of illustration and shown on the accompanying drawing, in which:

FIG. 1 is a side elevational view of a liquid filling machine constructed in accordance with this invention;
FIG. 2 is a top view of the machine shown in FIG. 1;
FIG. 3 is a detail view of the flight conveyor;
FIG. 4 is a cross-sectional view taken on the section line 4—4 of FIG. 3;
FIG. 5 is an end view of the machine;
FIG. 6 is a top view of the cup dispensing assembly;
FIG. 7 of a side view, partly in section of the cup dispensing assembly;
FIG. 8 is a front view of the cup dispensing assembly;
FIG. 9 is a side view, partly in section, of the liquid feeding device;
FIG. 10 is a plan view of the lid transfer assembly;
FIG. 11 is a cross sectional view taken along the section line 11—11 of FIG. 10;
FIG. 12 is an enlarged cross-sectional view of the lid transfer assembly showing how it supports a lid;
FIG. 13 is a side view of the lid transfer assembly;
FIG. 14 is a perspective view of the cup elevating mechanism;
FIG. 15 is a cross sectional view of the liquid filling machine showing the cup capping mechanism and its actuating mechanism;
FIG. 16 is a side view of the transfer conveyor of the machine;
FIGS. 17 and 18 are detail views of the transfer conveyor; and
FIG. 19 is a plan view of the actuating mechanism of the liquid filling machine.

As suggested in the introduction, the machine of this invention shown in FIG. 1 is composed of a number of subassemblies which perform a variety of functions. The several subassemblies are described in detail below under appropriate subheadings. Before describing the various subassemblies in detail, a brief description is provided of FIG. 1 to afford the reader a general picture of the overall machine.

In FIG. 1, the machine is shown to include a base 20 supported on a pair of fixed wheels 22 and a pair of casters 24 which allow the machine to be moved from place to place without difficulty. The machine shown may be approximately eight feet in length and three and one-half feet wide. At the exit end of the machine there is an extension to the side which adds a few feet to its width. These dimensions are given merely to lend size to the picture created in the mind of the reader.

A flight conveyor 26 is mounted above the base 20 and travels a course defined by a pair of idler sprockets 28 shown on the left side of FIG. 1 and a pair of driven sprockets 30 which are shown in part in both FIGS. 1 and 5. Mounted on the base 20 and extending along the top run 32 of the flight conveyor 26 are (in order) a cup dispenser subassembly 34, a liquid feeding subassembly 36, a lid setting subassembly 38 with an associated lid transfer mechanism and a lid dispenser 40, a cup elevator subassembly 42, a transfer conveyor 44 and an exit conveyor 46. These subassemblies are described in detail below.

Flight conveyor 26

The flight conveyor 26 is shown in detail in FIGS. 1–4. The conveyor includes a pair of chains 50 and 52 disposed on opposite sides of the machine with each chain composed of two parallel rows of links 54 and 56 separated by a sleeve 58, and the several sleeves 58 act as wheels to run along the horizontal rails 60 disposed beneath the upper run 32 of the flight conveyor. In FIG. 4 the rail 60 is shown to carry a plastic rub rail 61. In FIGS. 3 and 4 every fourth link is shown to carry a horizontal flange 62, and the flanges are secured to a horizontal support 64 which with the flanges 62 define a bracket for supporting one end of one transverse plate 66 of the flight conveyor. The transverse plates 66 are shown in FIG. 2 to be provided with a number of openings (in this case six circular openings 68) each of which is sized to receive a cup C supported near its top adjacent the cup rim. This arrangement is clearly shown in FIG. 1. The space between the upper and lower runs of the flight conveyor is relatively open and uncluttered so that the cups may be carried in the position shown in FIG. 1 and nothing between the runs interferes with the cups.

The track 60 which supports the upper run of the flight conveyor 26 extends substantially between the idler and driven sprockets 28 and 30 and is supported on the frame 70 mounted on the base 20. The idler sprockets 28 (one shown in FIG. 1) are mounted on the left end of the frame, and a slot 72 is provided to afford adjustment by means of screws 73 of the spread of the idler sprockets 28 from the driven sprockets at the other end. The bottom run 74 of the flight conveyor 26 is supported by a pair of rails (not shown) made of nylon or some similar material that engage the face of the transverse plates 66. It is evident in the lower or return run 74 of the conveyor the plates 66 lie below the chains.

The flight conveyor 26 is driven by motor 80 supported on the base 20. The motor shaft carries a pulley 82 which in turn drives a belt 84 that extends about a second pulley 86 mounted on the input shaft of the reduction box 88. The reduction box 88 is in turn mounted on and operatively connected to the input of cam box 90. Output shaft 92 of the cam box 90 is connected through a clutch 94 to the shaft 93 which supports the driven sprockets 30. The rotation imparted to the shaft 93 and consequently to the shaft of the driven sprockets 30 is intermittent which causes the flight conveyor to move step by step across the frame and about the sprockets 28 and 30. The clutch 94 has an automatic reset to retime the drive of the flight conveyor with the drive for the various subassemblies after the machine has been shut down.

Cup dispensing subassembly 34

The cup dispensing subassembly 34 is actually composed of three separate units, one of which in shown in FIGS. 6–8, having a pair of discharge magazines so that each is capable of loading two of the six openings 68 in each flight conveyor plate 66. One unit will be described, and it is to be understood that the other two units are identical. This assembly is described and claimed in U.S. Patent No. 3,165,233 dated Jan. 12, 1965.

The subassembly 34 is supported on a pair of posts 100 mounted on opposite sides of the base 20 and which extend upwardly on each side of the flight conveyor 26. The posts 100 carry a support plate 102 that extends horizontally across the machine, and its vertical face 104 is provided with a dove tailed vertical slot 106 that receives the backing plate 108 of the cup dispenser 34.

A beam 110 is supported on the backing plate 108 by mounting screws 112. A pair of spaced upper transverse ribs 114 and a pair of corresponding lower transverse ribs 117 define with the beam 110 two generally H-shaped members as is evident in FIG. 6. The ribs of each pair normally straddle the openings 68 in the plate 66 of the flight conveyor 26 disposed below. The spaces between the ribs comprise passageways through which the cups or other types of containers pass from the pair of nested stacks in the assembly.

The nested stacks of containers in the assembly are laterally contained by means of the eight vertical guide rods 116 that extend through the ribs 114 and 117.

The stacks of containers are each intermittently supported by a pair of swinging arms 118 (one shown on the right side of FIG. 7). The arms 118 are disposed diametrically opposite one another on each side of each stack. The arms comprise a pair of side members 120 and 122 (see FIG. 8) which are secured together at their bottom by and support inwardly extending grippers 124 that engage the lower portion of the side wall of the lowermost container of a stack when the arms are in their position closest to one another. The arm shown in FIG. 7 is in that position. The arms are pivoted at their upper ends on the pintles 126. The arms are biased outwardly by means of coil springs 128 mounted on the pintles and each having one end 130 engaging the rib 117 and the other end 132 secured to the arms. This is clearly evident in FIG. 7. Thus, the springs serve to urge the arms to rotate to their outermost position wherein the grippers 124 are separated so as to allow the stack of nested cups to fall unless otherwise supported.

The cups above the lowermost cup in the stack are alternately supported by a second pair of vertical arms 134 which are shown on the left side of FIG. 7. The vertical arms 134 are also supported for pivotal motion on the pintles 126. The lower end of the arms each has bifurcated horizontal portions that provide a pair of spaced fingers 136. The fingers are adapted when in their innermost positions to support the penultimate container in the stack and consequently all those above it, by supporting that container at its rim.

Between each pair of fingers 136 is a vertical bar 138 having a horizontal flange 140. The bars 138 are adapted to reciprocate vertically when the fingers 136 are engaging the rim of the penultimate container of the stack so that the flanges 140 move downwardly and contact the rim of the lowermost container of the stack and urge it to drop from the stack if it has not already done so under the force of gravity.

The vertical bars 138 are mounted on the inner sides of their respective arms 134 and are attached by screws 142 to camming blocks 144 through vertical slots 146. The camming blocks are each provided with transversely extending slots 148 through which camming rods 150 extend. The camming blocks 144 are hollow and each contains a cup 152, the bottom of which sits on the camming rod 150. A coil spring 154 is disposed inside the cup and urges it against the rod. The spring serves constantly to urge the camming block 144 upwardly relative to the camming rod. Thus, as the rod moves downwardly in the camming slot 148, the block is maintained in its uppermost position under the force of the spring 154 until the rod reaches the bottom of the camming slot whereupon it then forces the block downwardly and carries with it the bar 138.

The camming rods 150 are rotatably mounted on a carrier block 156, and the portions of the rods in contact with the camming blocks 144 are eccentric relative to the axis of rotation of the camming rods on the block 156. The camming rods are rotated in the block 156 by means of the lead screw 158 which contacts the camming rod in the block 156. By rotating the knob 160 at the end of the lead screw 158, the horizontal displacement of the portions of the camming rods which lie within the slots 158 may be varied with respect to the portions which lie within the block 156 so as to vary the camming action for different sizes of containers.

The carrier block 156 is secured to the bottom of guide rods 162 which are slidably mounted in the beam 110, and the block is urged in a downward direction relative to the beam by means of coil springs 164 which surround posts 166. This is evident in FIG. 7. The guide rods 162 extend upwardly above the beam 110 and are secured to a cross bar 168 by bolts 170. One end 172 of the bar 168 is adapted to overlie and be powered by the reciprocally movable shaft 174 slidable within the column 100 and driven by the mechanism disposed in the base 20 described in detail below. A handle 176 is carried by the other end of the bar 168 for manipulation of the bar to assure engagement with the rod 174 as well as disengagement thereof when desired.

From the foregoing it is evident that in the rest position the grippers 124 are disposed close enough to one another on opposite sides of each stack of containers that they support the stack by engaging the lower sidewall of the lowermost container. When the shaft 174 driven by the actuating mechanism within the base 20 moves downwardly, the block 156 moves downwardly with it under the influence of the springs 166 which cause the bar 168 to follow the rod 174. This downward movement of the block 156 causes the camming rods 150 to act upon the camming slots 148 in the camming blocks 144 to move the blocks inwardly toward one another so that the fingers 136 as well as the horizontal flange 140 lie beneath the rim of the penultimate container in the stack. Continued downward movement of the block 156 causes the camming rod to move to a position opposite the inclined rear edge 178 of the arms 118, which as is apparent in FIG. 7 allows the grippers 124 to separate or move outwardly and release the lowermost cup. This further continued downward movement of the camming rods 150 also carries with it the camming blocks 144, and in turn the vertical bars 138 are carried downwardly so that the horizontal flange 140 of each bar pushes downwardly upon the rim of the lowermost cup to assure that it is released from the stack. Thus the lowermost cup in the stack is discharged while all of the cups above are supported by engagement of the fingers 136 beneath the rim of the penultimate cup in the stack.

Liquid feeding subassembly 36

In FIG. 9, a single filler or nozzle assembly 180 is shown supported on a bracket 182 in turn mounted on bridge 184 supported on the top of shafts 186 on each side of the flight conveyor. The shafts 186 are actuated vertically by the drive mechanism within the base 20 described in detail below. The assembly includes a nozzle 188 in the form of a tube which is raised and lowered by actuation of the shafts 186. A valve disc 190 is urged against the lower edge 198 of the nozzle 188 by a spring 192 that encircles the pin 194 carried by the valve disc 190. The bottom of the spring bears against a perforated wafer 196 that extends across the nozzle 188.

The disc 190 is adapted to be unseated from the valve seat 198 formed at the bottom of the nozzle 188 by the pressure of the liquid which is fed to the nozzle when the dispensing occurs. The nozzle is supplied with liquid by means of the flexible hose 199 that extends from the top of the nozzle as viewed in FIG. 1 to the liquid supply chamber 201. A variety of different arrangements may be provided to drive liquid through the hose 199 to the nozzle 188 intermittently during each phase of the operation when a container comes to rest in the station of the filling subassemblies 36. The housing 201 may contain a number of individual cylinder type pumps for supplying a metered amount of liquid to the nozzles, and typically, the specific mechanism may take the form shown in Patent No. 3,100,513 issued Aug. 13, 1963. It will be appreciated that the type of metering employed to direct liquid through the various nozzles does not form part of the present invention.

In FIG. 9, it will be noted that when the nozzle is in its elevated position, the valve disc 190 is seated on the seat 198 and no beverage flows through the nozzle to the container beneath. When the container is to be filled, the nozzle is lowered so that its bottom is well within the container and adjacent the container bottom. In the lower position shown in broken lines in FIG. 9, the liquid is directed through the hose 199 to the nozzle, which forces the valve disc 190 to unseat. The contours of the disc 190 are such that the beverage or other liquid under pressure is spewed out the nozzle in the direction of the arrows 203 and then bounces off the container walls to the bottom of the container. As the container is filled, the nozzle 188 is withdrawn.

It will also be noted in connection with FIG. 9 that the disc 190 makes a line contact with the seat 198 as opposed to contacting the seat over a wide annular surface. This configuration reduces the likelihood of pulp or other solids within the liquids from being caught between the disc and the seat and prevent the nozzle from closing properly. It is important that the nozzle be closed fully by the valve 190 to prevent dripping of the liquid while the containers are being transported by the flight conveyor from one station to another. The disc 190 is not likely to become clogged by pulp discharged from the nozzle, and when the pressure is relieved by shutting off the pump which supplies the beverage through the hose 199, the disc will seat properly and completely close the nozzle.

Lid dispenser and transfer mechanism 40

In FIG. 11 the bottom of one dispenser 200 is shown diagrammatically positioned above the flight conveyor 26. The dispenser 200 is supported on a post 201 (see FIG. 1) extending upwardly from the frame 42 on the sides of the base. The dispenser 200 may be identical to the dispenser for the cups shown at 34 except for minor changes in the shapes of the fingers to compensate for the different configuration of the lid rim. As these details do not form part of the present invention they will not now be described. Suffice it to state that the dispenser 200 represents one of three duplex dispensers located above the flight conveyor 26, and they are designed to discharge lids from each of their two stacks, one at a time, to the transfer mechanism 204 disposed beneath.

The transfer mechanism 204 includes a stationary platform 206 provided with six longitudinally extending slots 208 (see FIGS. 10 and 11) provided in its upper surface, each of which is aligned with one of the rows of openings 68 in the plates 66 lying in upper run 32 of the flight conveyor. The slot 208 in FIG. 10 is shown to be enlarged at 210 immediately below the dispenser 200 so that a lid discharged from the dispenser will fall into the slot 208 at point 210. Thus the end 210 serves as an inlet to the slot 208. The rear end of the slot 212 terminates above a through hole 214 which is aligned with one opening 68 in the plate 66 of the flight conveyor disposed beneath when the conveyor temporarily stops and therefore, when a lid is transferred from the inlet 210 to the rear end of the slot 212 above the hole 214, the lid may be moved downwardly through the hole 214 and seat itself on the rim of the cup C disposed in the opening 68 in the plate 66.

A shuttle 216 includes a bar 218 that extends across the front end of the platform 206 and is adapted to slide along the upper face of the platform from the front end at the inlet 210 in the position shown in FIG. 11 to a position adjacent the hole 214. Carried by the bar 218 are six pushers 220, each extending into one of the slots 208. When a cup lid is dropped by the dispenser 200 into the inlet 210 of slot 208 it is in a position to be pushed by the pusher 220 along the slot 208, rearwardly to the top of the hole 214.

To avoid marring of the bottom of the lid as it is pushed along the slot 208 from the inlet 210 to the rear end 212, a pair of shoulders 222 are provided along the sides of the slot 208 and extend from the inlet 210 to the discharge end 212. The width of the slot 208 between the portions 210 and 212 is substantially equal to the width of the lower portion of the lid L, that is, the lid minus its top flange and skirt (see FIG. 12) S. Consequently, when the lid is pushed rearwardly in the slot 208 its skirt S will align itself automatically with the shoulders 222, and as the front edges 224 are beveled as suggested in FIG. 11, the skirt S will ride up on the shoulders 222. The depth of the slot 208 beneath the shoulders 222 is such that the bottom wall of the lid will not engage the bottom of the slot but rather will be free of it so that as the lid is pushed by the shuttle 216 toward the discharge hole 214, the lid will not be scratched or defaced in any way.

In FIGS. 1 and 13 the lid transfer assembly is shown supported on posts 226 extending upwardly from the frame 70 so that the platform 206 lies above the flight conveyor 26 a distance just sufficient to allow the cups to pass beneath it as they are moved along the course by the flight conveyor. Consequently lids that pass through the hole 214 almost immediately contact the rim of the cup beneath when the lids are free of the hole 214.

The shuttle 216 is shown to be operated by a bell crank 230 which is pivotally mounted on the frame 70 on stub shaft 232. The shorter arm 234 of the crank is connected to a link 236 on the top of rod 238 which is actuated vertically by a drive which is described below. The upper end of the longer arm 240 of the crank is connected by a link 242 to the shuttle bar 218. Thus, when the rod 238 is drawn downwardly, the crank 230 pivots counterclockwise as viewed in FIG. 13 to move the shuttle 216 to the left. In this manner the mechanism of FIG. 13 transfers the shuttle 216 and the lids engaged by it from the inlet end of the slot 208 to the hole 214.

Lid capping mechanism 38

In FIG. 15 the capping mechanism 38 is shown to be supported on a pair of posts 250 which serve as sleeves for shafts 252 that are movable between raised and lowered positions by a drive disposed in the base 20. The shafts 252 support a bridge 254 on which are mounted six presser pads 256 that move up and down with the bridge 254 in response to actuation of the rods. The pads 256 are positioned to push the lids through the holes 214 at the rear of the slots 208 in the platform 206 and firmly onto the rims of the cups C beneath, to seat the lids on the cups. It will be appreciated that actuation of the bridge 254 carrying the presser pads 256 is timed with the operation of the shuttle 216 so that the downward stroke of the bridge takes place when the lids are disposed in the slots 208 above holes 214. It should also be appreciated that the diameter of the hole 214 in each slot 208 is such that the lid L will stick at its periphery in the hole 214 and will not drop through it but rather will remain at the top of the hole in the slot until the presser pad actually engages the lid and pushes it through and onto the cup rim. The mechanism for actuating the shafts 252 is described in detail below under the title "drive mechanism."

Cup elevator assembly 42

In order to remove the cups from the flight conveyor 26, it is obviously necessary to elevate the cups so that they are no longer surrounded by the margins of the openings 68 formed in each of the flight conveyor plates 66. This is accomplished by the assembly shown in FIG. 14.

In FIG. 14, a bar 270 is shown which extends transversely across the base 20 from one side of the machine to the other. The bar 270 is disposed between the upper and lower runs of the flight conveyor 26 and is supported on a pair of posts 272, one on each side of the base 20, which raise and lower the bar 270 by means of the drive mechanism disposed in the base 20. The bar 270 carries a lift pad 274 in the form of a flat disc 276 and a cylindrical body 278 having a threaded stem 280 that is screwed into the bar 270. An adjusting nut 282 is provided on a threaded stem 280 to raise and lower the pad 274.

In FIG. 16, the lift pad 274 is shown to be disposed beneath the transfer conveyor 44, and the function of the elevator mechanism is to free the cups from the openings 68 in the plates 66 so that the transfer conveyor can transport each of the cups to the exit conveyor 46. It will be noted in FIG. 16 that the lift pad is positioned to lift a cup out of the opening 68 in the flight conveyor plate 66 immediately in front of the edge 284 of the platform 286 of the transfer conveyor. Thus, the transfer conveyor 44 by the apparatus about to be described can transport the cups freed from the openings 68 in the flight conveyor plates 66 across the platform 286.

Transfer conveyor 44

The transfer conveyor 44 is mounted on a pair of vertical frame extensions 300 (one shown in FIG. 1) that are secured to the frame 70. The vertical extensions 300 are disposed one on each side of the machine, and a bridge 302 spans the tops of the members 300. A pair of long U-shaped brackets 304 are also supported on the side members 300 and extend along the sides of the machine parallel with the direction of travel of the flight conveyor 26. Two shafts 306 and 308 extend across the machine between the tops of the opposite arms of each U-shaped bracket. The shaft 306 carries a pair of sprockets 310 and a second pair of sprockets 312 are mounted on the shaft 308, adjacent the ends. The shaft 308 is driven through a series of shafts and gears 314 which include beveled gear box 316, shaft 318, beveled gear box 320, shaft 322 and output shaft 324 of the gear box 90. Endless chains 326 extend about each pair of sprockets 310 and 312 as shown in FIGS. 2 and 16, and the chains 326 in turn support the wiper assemblies 328.

In FIGS. 16 and 17 the operation of the wiper assemblies 328 is illustrated. Each wiper assembly includes a pair of bars 330 and 332 that extend between the two chains and are secured to opposite links thereof and travel about the course defined by the sprockets 306 and 308 with the chains. (One wiper assembly is described.) The chains travel in the direction of arrow 334 as shown in FIG. 16 with the bar 332 leading the other bar 330. The bar 330 carries a pair of cranks 336, one adjacent each end of the bar. The cranks 336 are fixed to and do not rotate relative to the bars 330, but the bars themselves are mounted for rotation about a central axle which in turn is fastened to the chain. The elbow 338 of each crank arm 336 carries a roller 340, and the roller 340 with the bars 330 and 332 follows a track 342 shown in FIG. 17. A spring 344 is secured to each of the cranks 336 and is wound about the bar 330 and is connected in turn to the other bar 332. The springs 344 urge the cranks 336 to move in a direction as indicated by arrow 346. That is, the springs 344 urge the cranks to pivot so that their long arms 348 move in a direction opposite to the direction of travel of the cranks about the course defined by chains 326.

The track 342 is composed of an upper run 350 and a lower run 352 connected together by a radius at their rearward ends described by the circular track 354. The front end 356 of the lower run 352 carries a cam track extension 358 which climbs upwardly in an arc 360. The track 342 is followed by the rollers 340 carried at the bend in the crank arms 336 while the rollers 330 and 332 follow the course defined by the chains 326. Consequently, while the courses defined by the chain and the lower track 352 are parallel throughout the extent of the track 352 and therefore no pivotal motion is imparted to the cranks 336, when the rollers 340 climb up the arcuate track 360 of extension 358 under the influence of the spring 344, the longer arms 348 of the cranks tip to the left as viewed in FIG. 17 in the direction suggested by arrow 346 which is the direction of actuation of the cranks under the influence of the springs.

The cranks 336 carry a pusher plate 370 which is screwed or otherwise fastened to the long legs 348 and bridges the exit conveyor transversely of the flight conveyor as shown in FIG. 5. The pusher plates 370 are L-shaped in cross section with the arm 372 provided at its leading edge 374 with recesses 376 which engage the sides of the cups when they are raised in the openings in the flight conveyor plates as suggested in FIG. 16. The plates push the cups along the platform 286 to the exit conveyor 46 by means of the recesses 376 that engage each cup. It is apparent in FIG. 16 that unless some means is provided for moving the cranks 336 with the pusher plates 370 rearwardly and above the rims of the cups after they are placed on the exit conveyor 46, the pusher plates 370 would push the cups off the exit conveyor 46 and tip over the cups. The action of the arcuate track 360 in allowing the spring 344 to tilt the crank 336 rearwardly and upwardly as the cups reach the exit conveyor 46, avoids knocking the cups off the exit conveyor once they are deposited on it by the pusher plate 370. The arcuate track 360 lies just above the transfer conveyor so that the action shown in FIG. 17 occurs just as the cup reaches the position of the right cup shown in FIG. 16. There are two pairs of wiper assemblies 328 in the transfer conveyor, and they are arranged 180° apart on the endless chains 326 that travel about the sprockets 310 and 312.

Exit conveyor 46

The exit conveyor 46 shown in FIGS. 2 and 5 is disposed at the end of the machine and travels a course defined by the sprockets 400 and 402. The upper run 404 of the exit conveyor includes a fixed flat support 405 disposed at an elevation parallel to the platform 286 so that the cups pushed from the platform 286 may move onto the upper surface of the support of the exit conveyor. A plurality of pusher brackets 412 are carried by a pair of chains 406 and 408 that travel a course defined by the sprockets 400 and 402, and brackets 412 move over the fixed support 405 and push the cups deposited on it from right to left as viewed in FIG. 5.

The pusher brackets 412 are generally U-shaped with the two arms 414 secured to the chains. The cross member 416 is bent to provide a pocket for the base of the containers. The pockets serve to pick up and center the cups deposited on the plate 405 with respect to the direction of motion of the conveyor so that each of the cups is aligned precisely as it reaches the end of the plate 405. The pockets 416 prevent the cups from moving to the left or right side of the plate 405 and falling off it. In FIG. 5 it will be noted that six pusher brackets 412 are spaced to the right of the six cups C located at the end of the six parallel lines of the machine so that when the cups are deposited on the plate 405, the brackets 412 are in a position to move them as the upper courses of the chains travel toward the sprocket 400. It will be understood that the six cups shown in FIG. 5 will be moved to the left of the left most line in the machine so that six empty stations will again be provided at the ends of the six lines to receive six more cups deposited by the next stroke of the transfer conveyor.

In FIG. 5 the plate 405 is shown mounted on the frame 420. The drive for the exit conveyor is provided from the drive of the shaft 324 which also drives the transfer conveyor. It will be noted in FIG. 5 that a shaft 422 extends to the sprocket 400 and is disposed between the upper and lower courses of the exit conveyor. The box 424 on shaft 422 provides the power to the shaft 422 and is connected to the drive shaft 318 which drives the sprockets 312 of the transfer conveyor through box 316. It is evident that the exit end of the exit conveyor at the sprocket 400 may be disposed adjacent a platform or other point of collection where operators may be stationed to receive the filled and capped containers for packaging by suitable transfer mechanisms.

Drive mechanism

The drive mechanism disposed in the base 20 serves to operate the cup dispenser, filler, cap presser, lid dispenser, lid transfer mechanisms and the cup elevator. This mechanism is shown in FIGS. 5, 15 and 19.

In FIG. 5 chain belt drive 440 is shown composed of chain belts 442, a drive sprocket 444 and a driven sprocket 446. The drive belt sprocket 444 is driven by shaft 448 which is one of the outputs from the gear box 90. The driven sprocket 446 is connected to and in turn drives the main shaft 450 that extends lengthwise through the base 20 of the machine as shown in FIG. 19. The shaft 450 as shown in FIGS. 15 and 19 carries a series of cams 452 that serve to operate the various subassemblies at the stations along the flight conveyor upper run 32. In FIG. 15 a typical actuating assembly 454 is shown, which is driven by one of the cams 452. In that figure, the cam 452 is shown to include a cam track 456 shaped to impart to the rods 252 on each side of the flight conveyor harmonic motion vertically within the sleeves 250. In front of the cam 452 as viewed in FIG. 15 is a casting 458 within which is provided a vertically movable block 460 slidably supported on the posts 462. The block in turn carries a cam follower (not shown) which is disposed in the cam track 456. Consequently, as the cam 452 rotates, the track 456 causes the cam follower and the block 460 to move up and down on the posts 462. This reciprocal motion of the block 460 is transferred to the rods 252 by the linkages 464. As the two linkages are identical, only one will be described.

A first pivot arm 466 is connected by means of a pivot pin 468 to the block 460, and the other end of the arm 466 is connected to the pivotal support 470. The pivotal support 470 is mounted in a slot 472 in the casting 458, and consequently the pivot point established may move horizontally. The other arm 474 which comprises the linkage 464 is connected to the pivotal support 470 at one end and its other end is connected by a link 476 to bracket 478 which in turn is connected to the lower end of the rod 252. It will be appreciated that when the block 460 moves upwardly from the position shown in FIG. 15, the linkage 464 will pivot about the pivotal support 470 so that the outer end of the linkage will move downwardly and carry with it the rod 252. And when the block 460 moves downwardly to the position shown in FIG. 15 from an elevated position, the linkage assembly 464 causes the rod 252 to move upwardly. The oscillatory motion imparted to the rods 252 is transferred to the bridge 254 which in turn carries the presser pads 256 of the lid capping mechanism.

The structure shown in FIG. 15 for actuating the presser pads 256 is substantially indentical to the structure for actuating the posts or shafts which control the cup dispenser assembly 34 and the lid dispenser and transfer assembly 40. The actuating mechanism for the liquid feeding device and the cup elevator 42 is similar to the actuating mechanism 454 described in connection with FIG. 15 except that the pivotal support for the linkage system is adjustable so as to vary the relative lengths of the stroke at the inner and outer ends of the linkages. This is apparent in FIG. 19 wherein the actuating assemblies for the liquid filling device and cup elevator are shown. As the two are identical, the mechanism for the cup elevator will be described and it is to be understood that it is representative of both actuating devices.

In FIG. 19, the casting 500 is shown disposed immediately beside the cam 452, and disposed within the casting (not shown) is the vertically movable block supported on the posts 502. Connected to the block are the two linkages 504 which in turn control the vertical rods 272 shown in FIG. 14. The linkages 504 each include an inner arm 506 and an outer arm 508 which are rigidly aligned with one another and pivotally supported on the fixture 510. It will be recognized that the mechanism thus far described is the same as that shown in FIG. 15.

The adjustability features of the fulcrum of the linkage 504 as established by the fixture 510 is additional structure not found in the arrangement of FIG. 15. Referring again to FIG. 19, it will be noted that each of the fixtures 510 is carried by a support 512 which in turn is movable toward and away from the center of the machine by means of the lead screw 514 that extends through threaded holes in the ends 516 of each of the supports 512. The threads 518 and 520 are opposite one another so that rotation of the screw 514 moves both the supports 512 either toward or away from the center of the machine. In this manner, the fixtures 510 remain the same distance from the pivot pins 522 which support the inner ends of their linkages on the vertically movable block. The outer ends of the linkages 504 are secured by links to the posts 272 in the same manner as shown in FIG. 15.

The adjustability of the stroke of the liquid feeding device and the cup elevator allows the lower position of the stroke to be varied, but the top of the stroke remains the same. This is so for the liquid feeding device because the height of the rim of the container above the flight conveyor plates 66 is the same regardless of the height of the container. That is, the shoulders provided in the side walls of the containers that engage the margins of the openings 68 are always the same distance from the container rims. Thus, the different sizes of containers extend down beneath the plate 66 different distances, and the nozzle 180 must be lowered different distances to reach the vicinity of the container bottom. In connection with the cup elevator mechanism it is always necessary to raise the bottom of the containers to the plane of the transfer platform 286, and therefore the top of the stroke remains fixed. But the different depths of the containers requires that the bottom of the stroke be variable.

From the foregoing description it is evident that the actuation of each of the various assemblies supported on or along the conveyor is controlled by the several cams 452 carried by the shaft 450. The particular shape of the cam tracks in each cam determines the type of motion imparted to each rod which supports or drives the various assemblies. It is also evident that the rotation of the shaft 450 is timed with the rotation of the sprocket 30 which drives the flight conveyor so that the shaft rotation and therefore the actuation of the several assemblies takes place only during that time when the flight conveyor is stationary. The shaft 450 is continuously rotated, while the sprocket 30 is not. The timing is accomplished by the cams 452.

The operation

In operation, the cup dispensing mechanisms 34 which in the embodiment shown comprise three twin magazine units are loaded with the containers to be filled by the machine. Similarly, the lid dispensers 40 are filled so that they may in turn supply lids to each of the containers for sealing them after the containers have been filled. Furthermore, the liquid supply is connected either by a hose 205 to the housing 201, or drums of the liquid are placed in the housing and secured to the pumping means (not shown) also disposed inside. When the motor 80 is turned on, the flight conveyor 26 moves step by step about the sprockets, and the drive mechanism disposed with the base 20 is actuated. The step by step movement of the flight conveyor causes the individual plates 66 to index in each of the stations occupied by the cup dispensing mechanism 34, the liquid feeding mechanism 36, the cap dispensing mechanism 40 with the lid presser assembly 38, the cup elevator assembly 42, the transfer conveyor 44 and the exit conveyor 46.

When the machine is first placed in operation, some means should be provided to prevent the nozzles of the liquid dispensing assembly 36 and the lid dispenser 40 from discharging until such time as the flight conveyor has been loaded with containers to a point wherein the plates below the nozzles 188 and holes 214 at their respective stations carry containers.

When the machine is operating, with each actuation of the cam 452 shown at the left of FIG. 19, the shaft 174 will be lowered so as to enable the various magazines to dispense the lowermost cup in each stack so as to fill the six holes in the plate 66 of the flight conveyor below with containers. This discharge of containers into the holes 68 of the plate is timed with the temporary stoppage of the conveyor so that the plate is stationary in a position to receive the containers. Each plate in turn is brought in order to the station occupied by the cup dispensers 34 and they are moved from that station identified by the letter A in FIG. 1, step by step by station B. At station B, during the temporary stoppage of the flight conveyor, the nozzles are lowered into the containers and the beverage is discharged through the hose 199 and the nozzle 188 to the containers. As the containers are filled, the nozzles are slowly withdrawn. Throughout this operation the flight conveyor remains stationary. Prior to the institution of the operation, an operator will have adjusted the length of the stroke of the nozzles by means of the lead screw 550 provided with a handle 552 on the side of base 20. The lead screw 550 varies the position of the pivotal supports 554 in the manner described in connection with the cup elevating mechanism shown on the right side of FIG. 19. It is important that the nozzle be lowered at the beginning of the filling operation to a position wherein the discharge is adjacent the bottom of the cup as opposed to the top. Consequently, because containers of different shapes are adapted to be filled on the machine, the proper adjustment must be made of the nozzle stroke to assure that it approaches the bottom.

After the cups have been filled at station B, they are indexed step by step to station C where the lid dispensing mechanism 40 discharges a lid to the transfer mechanism shown in FIGS. 10-13. The lids are discharged into the slots 208 and then transferred against the direction of travel of the flight conveyor to a position below the presser pads 256. The presser pads then drive the lids through the holes 214 in the plate 206 and firmly onto the rim of the container C. Simultaneously with the actuation of the presser pads 256, a flight support (not shown) may be provided to hold the bottom of the flight conveyor as the container is being capped to counteract the pressure applied to the container by the presser pad. In FIG. 19, the actuating mechanism for the support is shown. It may basically take the form of the cup lift mechanism.

From station C, the cups are transported step by step to station D where they are lifted by the elevator mechanism to the platform 286 shown in detail in FIG. 16. Like the liquid feeding device the stroke of the elevator must be adjusted. From that station, the transfer conveyor 44 which constantly operates pushes the cups elevated by the assembly 42 across the platform 286 to the upper surface of the exit conveyor 46. The exit conveyor may direct each of the containers through a printer or other marking device so as to appropriately mark the container lids and from the exit conveyor they may be packaged or otherwise be carried away from the machine.

From the foregoing description those skilled in the art will appreciate that numerous modifications may be made of this invention without departing from its spirit. Therefore, it is not intended to limit the breadth of this invention to the single embodiment illustrated and described. Rather, it is intended that the scope of this invention be determined by the appended claims and their equivalent.

What is claimed is:

1. A machine for filling containers with liquid comprising:

a conveyor defining a run and a base supporting the conveyor, a plurality of stations spaced along the run, container supports provided on the conveyor each for receiving a container to be filled with liquid, drive means connected to the conveyor for moving the conveyor step by step along the run with the container supports stopping at each station, a container dispenser mounted on the base in a first station for depositing a container on each container support as each support stops at that station, a liquid filling device mounted on the base in a second station to which the container supports move after leaving the first station for filling each container with liquid, a lid dispenser mounted on the base in a third station to which the container supports move after leaving the second station for securing a lid on each container after they are filled with liquid, transfer means mounted on the base in a fourth station to which the container supports move after leaving the third station for removing the filled and covered containers from the container supports on the conveyor, and an exit device mounted on the base for receiving the containers removed from the conveyor, said lid dispenser including a plate disposed above the conveyor and the tops of the containers and having a recess for receiving a lid, a shoulder provided along the margins of the recess above the recess bottom for engaging the skirt of a cover-all lid and holding the bottom surface of the lid off the bottom of the recess, a magazine mounted on the base above the plate for depositing a lid in the recess, a hole through the plate as a continuation of the recess aligned with the top of each container disposed in the third station, a presser pad mounted on the base above the hole, and drive means connected to the presser pad for lowering the pad to push a lid disposed in the recess through the hole and firmly onto the top of the container disposed in the third station, 2. A machine for filling containers as defined in claim 1 further characterized by:

said recess having a lid receiving end displaced from the hole, a shuttle movable on the plate for moving each lid deposited in the lid receiving end to a position in alignment with the hole.

3. A machine for filling containers with liquid comprising:

a conveyor defining a run and a base supporting the conveyor, a plurality of stations spaced along the run, container supports provided on the conveyor each for receiving a container to be filled with liquid, drive means connected to the conveyor for moving the conveyor step by step along the run with the container supports stopping at each station, a container dispenser mounted on the base in a first station for depositing a container on each container support as each support stops at that station, a liquid filling device mounted on the base in a second station to which the container supports move after leaving the first station for filling each container with liquid, said liquid filling device including a nozzle member mounted on the base above the conveyor, nozzle support means for supporting the nozzle member for up and down movement on the base, drive means for the nozzle support means for lowering the nozzle member into each container as each container stops in the second station so that the liquid flows through the nozzle member when the nozzle is in the container, a lid dispenser mounted on the base in a third station to which the container supports move after leaving the second station for securing a lid on each container after they are filled with liquid, transfer means mounted on the base in a fourth station to which the container supports move after leaving the third station for removing the filled and covered containers from the container supports on the conveyor, an exit means mounted on the base for receiving the containers removed from the conveyor, said exit means including a platform disposed above the conveyor in the fourth station, an elevating mechanism mounted on the base for raising each filled container from the container supports on the conveyor and carrying the container so that the bottom of the container is in the plane of the platform, and a transfer conveyor mounted above the first-named conveyor for pushing each container from the elevating mechanism onto the platform.

4. A machine for filling containers with liquid comprising:

a conveyor defining a run and a base supporting the conveyor, a plurality of stations spaced along the run, container supports provided on the conveyor each for receiving a container to be filled with liquid, drive means connected to the conveyor for moving the conveyor step by step along the run with the container supports stopping at each station, a continer dispenser mounted on the base in a first station for depositing a container on each container support as each support stops at that station, a liquid filling device mounted on the base in a second station to which the container supports move after leaving the first station for filling each container with liquid, said liquid filling device including a nozzle member mounted on the base above the conveyor, nozzle support means for supporting the nozzle member for up and down movement on the base, drive means for the nozzle support means for lowering the nozzle member into each container as each container stops in the second station so that the liquid flows through the nozzle member when the nozzle is in the container, a lid dispenser mounted on the base in a third station to which the container supports move after leaving the second station for securing a lid on each container after they are filled with liquid, transfer means mounted on the base in a fourth station to which the container supports move after leaving the third station for removing the filled and covered containers from the container supports on the conveyor, an exit means mounted on the base for receiving the containers removed from the conveyor, a plurality of rows of container supports mounted side by side on the conveyor and defining a like number of runs, duplicate container dispensers, liquid filling devices, lid dispensers, and transfer means mounted at each station for performing their respective functions as each support reaches each station, the lid dispensers each having a presser pad member that moves up and down to press the lids firmly on the containers in the second station, the transfer means including an elevating mechanism member that moves up and down to raise the containers from the container supports, and actuating means for at least one of the members including a drive shaft extending through the base, a cam carried by the shaft and rotating therewith, a block movable up and down in the base and driven by the cam, a pair of levers disposed in the base and pivoted about a horizontal axis intermediate their ends and connected each at one end to the block for moving the other ends of the levers up and down in response to rotation of the cam, and means linking the other ends of the levers to the member for raising and lowering the member.

5. A machine for filling containers as defined in claim 4 further characterized by:

said actuating means being connected to one of either the elevating mechanism member and the nozzle member, and means for adjusting the position of the pivots of levers with respect to the ends of the levers for adjusting the length of the up and down movement of the other ends of the levers.

6. A machine for filling containers as defined in claim 1 further characterized by:

said conveyor comprising a plurality of elongated plates extending perpendicular to the run, a plurality of holes provided in each plate aligned lengthwise of the plates and each serving as a container support for holding the containers to be filled adjacent the top of each container.

7. A machine for filling containers as defined in claim 6 further characterized by:

said conveyor plates being carried by a pair of spaced apart endless chains, two pairs of sprockets mounted on the base with each pair mounted in a shaft and with the two shafts disposed in horizontal planes so as to orient the run of the conveyor in a horizontal plane and with a return run below the first-named run, and a motor mounted on the base for driving one of the shafts.

8. A machine for filling containers as defined in claim 7 further characterized by:

the exit device including a relatively narrow conveyor travelling a run at right angles to the runs of the first-named conveyor, said transfer means simultaneously depositing on the narrow conveyor one container from each line of the first-named conveyor in the fourth station.

9. A machine for filling containers with liquid comprising:

a conveyor defining a plurality of parallel runs and a base supporting the conveyor, a plurality of stations spaced along the runs, a plurality of rows of container supports provided on the conveyor each for receiving a container to be filled with liquid, drive means connected to the conveyor for moving the conveyor step by step along the runs with the container supports stopping at each station, a plurality of container dispensers mounted on the base in a first station of each run for depositing a container on each container support as each support stops at that station, a plurality of liquid filling devices mounted on the base in a second station of each run to which the container supports move after leaving the first station for filling each container with liquid, said liquid filling devices including a nozzle member mounted on the base above the conveyor, nozzle support means for supporting the nozzle members for up and down movement on the base, drive means for the nozzle support means for lowering the nozzle members into each container as each container stops in the second station so that the liquid flows through the nozzle members when the nozzles are in the container, a plurality of lid dispensers mounted on the base in a third station of each run to which the container supports move after leaving the second station securing a lid on each container after they are filled with liquid, transfer means mounted on the base in a fourth station of each run to which the container supports move after leaving the third station for removing the filled and covered containers from the container supports on the conveyor, an exit means mounted on the base for receiving the containers removed from the conveyor, said conveyor comprising a plurality of elongated plates extending perpendicular to the run, a plurality of holes provided in each plate aligned lengthwise of the plates and each serving as a container support for holding the containers to be filled adjacent the top of each container, said conveyor plates being carried by a pair of spaced apart endless chains, two pairs of sprockets mounted on the base with each pair mounted in a shaft and with the two shafts disposed in horizontal planes so as to orient the run of the conveyor in a horizontal plane and with a return run below the first-named run, and a motor mounted on the base for driving one of the shafts, the lid dispensers each having a presser pad member that moves up and down to press the lids firmly on the containers in the second station, the transfer means including an elevating mechanism member that moves up and down to raise the containers from the container supports, and actuating means for at least one of the members including a shaft extending through the base, a cam carried by the shaft and rotating therewith, a block movable up and down in the base and driven by the cam, a pair of levers disposed in the base and pivoted about a horizontal axis intermediate their ends and connected each at one end to the block for moving the other ends of the levers up and down in response to rotation of the cam, and means linking the other ends of the levers to member for raising and lowering the member.

10. A machine for filling containers as defined in claim 9 further characterized by:

said actuating means being connected to one of either the elevating mechanism member and the nozzle member, and means for adjusting the position of the pivots of levers with respect to the ends of the levers for adjusting the length of the up and down movement of the other ends of the levers.

References Cited

UNITED STATES PATENTS

| 2,841,939 | 7/1958 | Marceau | 53—310 |
| 2,897,643 | 8/1959 | Byrd | 53—281 X |
| 2,972,216 | 2/1961 | Schmidt | 53—281 |
| 3,319,397 | 5/1967 | Lupovici | 53—282 |
| 2,965,141 | 12/1960 | Hoyer | 141—181 |

FOREIGN PATENTS

| 216,409 | 7/1958 | Australia. |
| 1,051,770 | 12/1966 | Great Britain. |
| 1,066,575 | 4/1967 | Great Britain. |
| 1,186,768 | 2/1965 | Germany. |

TRAVIS S. McGEHEE, Primary Examiner

R. L. SPRUILL, Assistant Examiner

U.S. Cl. X.R.

53—306